United States Patent
Zhao et al.

(10) Patent No.: US 10,496,888 B2
(45) Date of Patent: Dec. 3, 2019

(54) GUARDIAN CAMERA IN A NETWORK TO IMPROVE A USER'S SITUATIONAL AWARENESS

(71) Applicant: MOTOROLA SOLUTIONS, INC, Chicago, IL (US)

(72) Inventors: Kang Kai Zhao, Chengdu (CN); Da-Jun Chen, Chengdu (CN); Xun Fei, Chengdu (CN); Yong Tian, Chengdu (CN); Dong Zhao, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/079,124

(22) PCT Filed: May 24, 2016

(86) PCT No.: PCT/CN2016/083134
§ 371 (c)(1),
(2) Date: Aug. 23, 2018

(87) PCT Pub. No.: WO2017/201670
PCT Pub. Date: Nov. 30, 2017

(65) Prior Publication Data
US 2019/0087662 A1    Mar. 21, 2019

(51) Int. Cl.
*H04N 5/247* (2006.01)
*G06K 9/00* (2006.01)
(Continued)

(52) U.S. Cl.
CPC ......... *G06K 9/00771* (2013.01); *G06F 3/013* (2013.01); *G06F 3/0488* (2013.01);
(Continued)

(58) Field of Classification Search
None
See application file for complete search history.

(56) References Cited

U.S. PATENT DOCUMENTS

| 8,908,034 B2 | 12/2014 | Bordonaro |
| 2007/0243854 A1 | 10/2007 | Taki et al. |
| (Continued) | | |

FOREIGN PATENT DOCUMENTS

| CN | 202713458 U | 1/2013 |
| CN | 104486835 A | 4/2015 |
| CN | 104571132 A | 4/2015 |

OTHER PUBLICATIONS

The International Search Report and the Written Opinion, corresponding patent application No. PCT/CN2016/083134, filed May 24, 2016, all pages.

*Primary Examiner* — Eileen M Adams
(74) *Attorney, Agent, or Firm* — Daniel R. Bestor

(57) ABSTRACT

A process for selectively activating a guardian camera in response to detecting a distracted user includes first identifying an available camera external to a mobile computing device (MCD) having a field of view that incorporates a current location of a user of the MCD. The MCD then detects that a user's attention is substantially focused on a user interface of the MCD, and responsively transmits an instruction to the available camera to transition to a recording state and/or to begin monitoring an area surrounding the user for unexpected movements or objects. In response to the MCD detecting an indication that the available camera has recorded an unexpected movement or object in the area surrounding the user, the MCD takes a responsive action.

20 Claims, 3 Drawing Sheets

(51) Int. Cl.
  *G06F 3/01*     (2006.01)
  *G06F 3/0488*   (2013.01)
  *G06T 7/20*     (2017.01)
  *G08B 25/01*    (2006.01)
  *H04N 5/232*    (2006.01)

(52) U.S. Cl.
  CPC .............. *G06T 7/20* (2013.01); *G08B 25/016* (2013.01); *H04N 5/23206* (2013.01); *H04N 5/247* (2013.01); *G06T 2207/30232* (2013.01); *G06T 2207/30252* (2013.01)

(56) References Cited

U.S. PATENT DOCUMENTS

| | | | |
|---|---|---|---|
| 2009/0022362 A1* | 1/2009 | Gagvani | G06T 7/254 |
| | | | 382/100 |
| 2012/0257061 A1 | 10/2012 | Edwards et al. | |
| 2014/0270378 A1* | 9/2014 | Aimura | G06K 9/00805 |
| | | | 382/103 |
| 2015/0092056 A1* | 4/2015 | Rau | G08G 1/167 |
| | | | 348/148 |
| 2016/0156850 A1* | 6/2016 | Werblin | G06F 3/013 |
| | | | 348/63 |

\* cited by examiner though other information such as vehicle histories, arrest records or outstanding warrants, health information, and other information that may aid the user in making a more informed determination of an action to take or how to resolve a situation, among other possibilities. However, while the user is interacting with their mobile computing device, their attention is also redirected from their surrounding environment to interacting with the mobile computing device, leaving them in a more vulnerable state than if they were not interacting with the mobile computing device.

GUARDIAN CAMERA IN A NETWORK TO IMPROVE A USER'S SITUATIONAL AWARENESS

This application is a National Stage filing under 35 USC § 371 of co-pending Patent Cooperation Treaty international application having Serial No. PCT/CN2016/083134 (the 'PCT international application') filed on May 24, 2016. This application claims priority to the PCT international application, the entire contents of which are incorporated herein by reference.

BACKGROUND OF THE INVENTION

Tablets, laptops, phones, mobile or portable radios, and other mobile computing devices are now in common use by users, such as first responders, and provide such users with instant access to increasingly valuable additional information such as vehicle histories, arrest records or outstanding warrants, health information, and other information that may aid the user in making a more informed determination of an action to take or how to resolve a situation, among other possibilities. However, while the user is interacting with their mobile computing device, their attention is also redirected from their surrounding environment to interacting with the mobile computing device, leaving them in a more vulnerable state than if they were not interacting with the mobile computing device.

Thus, there exists a need for an improved method, device, and system for improving situational awareness for a user while that user's attention is directed towards interacting with a mobile computing device.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
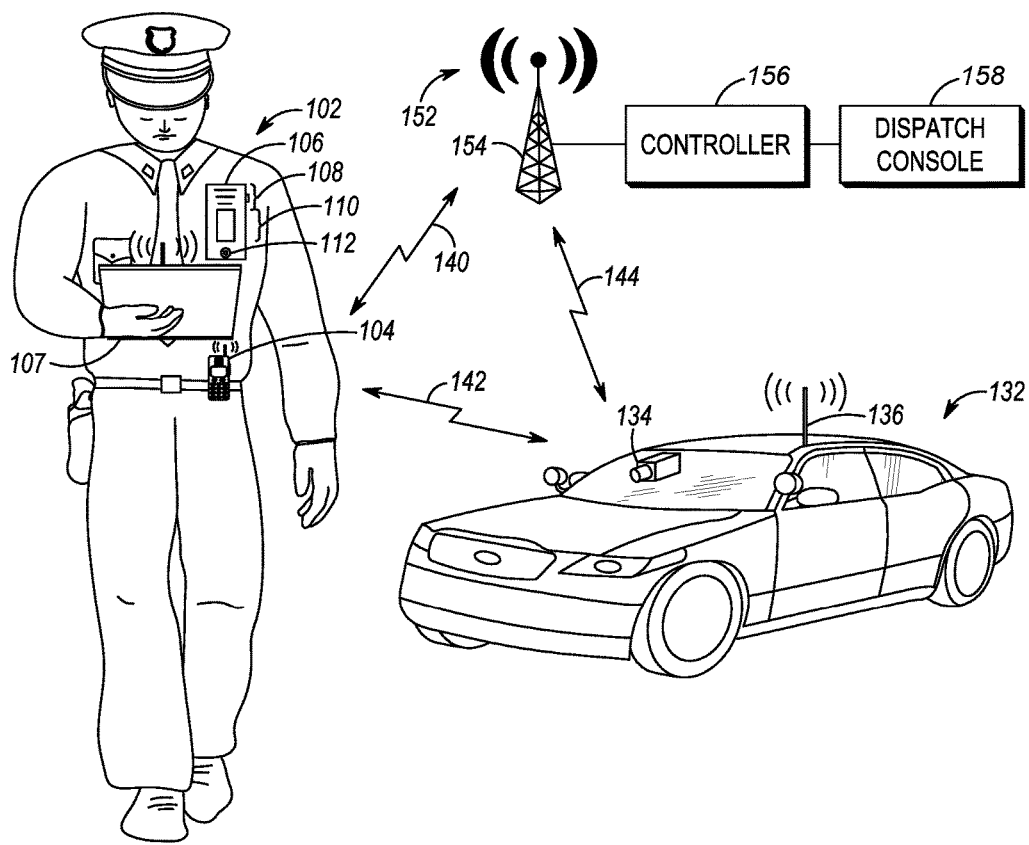
FIG. 1 is a system diagram illustrating improved situational awareness for a user while interacting with a mobile computing device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method, device, and system for improving situational awareness for a user while that user's attention is directed towards interacting with a mobile computing device.

In one embodiment a method of selectively activating a guardian camera in response to detecting a distracted user includes: identifying, by an mobile computing device having a user interface, one or more available cameras external to the mobile computing device and not directly electronically coupled to the mobile computing device, having a field of view that incorporates a current location of a user of the mobile computing device; determining, by the mobile computing device having a user interface, that a user's attention is substantially focused on the user interface; responsive to the determining transmitting, by the mobile computing device, an instruction to the one or more available cameras to transition to a recording state and/or begin monitoring an area surrounding the user for unexpected movements or objects; and detecting, at the mobile computing device, an indication that a particular one of the available cameras has recorded an unexpected movement or object in the area surrounding the user and the mobile computing device taking a responsive action.

In a further embodiment, a mobile computing device for selectively activating a guardian camera in response to detecting a distracted user includes: a display displaying a user interface; a wireless transceiver; and one or more processors configured to: identify one or more available cameras external to the mobile computing device and not directly electronically coupled to the mobile computing device, having a field of view that incorporates a current location of a user of the mobile computing device; determine that a user's attention is substantially focused on the user interface, and responsively: transmit, via the wireless transceiver, an instruction to the one or more available cameras to transition to a recording state and/or begin monitoring an area surrounding the user for unexpected movements or objects; and detect an indication that a particular one of the available cameras has recorded an unexpected movement or object in the area surrounding the user and take a responsive action.

In a still further embodiment, a system comprises: a mobile computing device comprising: a display displaying a user interface; a wireless transceiver; and one or more processors configured to: identify one or more available cameras external to the mobile computing device and not directly electronically coupled to the mobile computing device, having a field of view that incorporates a current location of a user of the mobile computing device; determine that a user's attention is substantially focused on the user interface, and responsively: transmit, via the wireless transceiver, an instruction to the one or more available cameras to transition to a recording state and/or begin monitoring an area surrounding the user for unexpected movements or objects; and detect an indication that a particular one of the available cameras has recorded an unexpected movement or object in the area surrounding the user and take a responsive action; and a remote wireless imaging device comprising: an imaging device; a second wireless transceiver; and one or more second processors configured to: receive, via the second wireless transceiver, the instruction to transition to a recording state and/or begin monitoring an area surrounding the user for unexpected movements or objects; responsive to receiving the instruction, enabling the imaging device and capturing images or video of an area surrounding the user; and analyzing the captured images or video for unexpected movements or objects and, responsive to detecting a first unexpected movement or object in the captured images or video, transmitting, via the second wireless transceiver, the indication to the mobile computing device.

Each of the above-mentioned embodiments will be discussed in more detail below, starting with example communication and device architectures of the system in which the embodiments may be practiced, followed by an illustration of processing steps for achieving an improved method, device, and system for improving situational awareness for a user while that user's attention is directed towards interacting with a mobile computing device. Further advantages and features consistent with this disclosure will be set forth in the following detailed description, with reference to the figures.

1. COMMUNICATION SYSTEM AND DEVICE STRUCTURES

Referring now to the drawings, and in particular FIG. 1, a communication system diagram illustrates a system 100 of wireless mobile computing devices including a first set that a user 102 (illustrated in FIG. 1 as a first responder) may wear, including a primary battery-powered mobile radio 104 used for narrowband and/or broadband direct-mode or infrastructure communications, a battery-powered radio speaker microphone (RSM) video capture device 106, and/or a tablet device 107 having a user interface and used for data applications such as incident support applications. System 100 may also include a vehicular mobile computing device in a vehicle 132 associated with the user 102 and having an associated vehicular video camera 134 and vehicular transceiver 136. Each of the mobile radio 104, RSM video capture device 106, tablet 107, and vehicular transceiver 136 may be capable of directly wirelessly communicating via a direct-mode wireless link 142, and/or may be capable of wirelessly communicating via a wireless infrastructure radio access network (RAN) 152 over respective wireless links 140, 144.

The mobile radio 104 may be any mobile computing device used for infrastructure RAN or direct-mode media (e.g., voice, audio, video, etc.) communication via a long-range wireless transmitter (e.g., in comparison to a short-range transmitter such as a Bluetooth, Zigbee, or NFC transmitter) and/or transceiver with other mobile computing devices and/or the infrastructure RAN. The long-range transmitter may have a transmit range on the order of miles, e.g., 0.5-50 miles, or 3-20 miles. In the example of FIG. 1, the mobile radio 104 may form the hub of communication connectivity for the user 102, through which other accessory devices, such as a biometric sensor, an activity tracker, a weapon status sensor, a heads-up-display, the RSM video capture device 106, and/or the tablet 107 may communicatively couple.

In order to communicate with and exchange audio and other media with the RSM video capture device 106 and/or the tablet 107, the mobile radio 104 may contain one or more physical electronic ports (such as a USB port, an Ethernet port, an audio jack, etc.) for direct electronic coupling with the RSM video capture device 106 or tablet 107, and/or may contain a short-range transmitter (e.g., in comparison to the long-range transmitter such as a LMR or Broadband transmitter) and/or transceiver for wirelessly coupling with the RSM video capture device 106 or tablet 107. The short-range transmitter may be a Bluetooth, Zigbee, or NFC transmitter having a transmit range on the order of 0.01-100 meters, or 0.1-10 meters. In other embodiments, the RSM video capture device 106 and/or the tablet 107 may contain their own long-range transceivers and may communicate with one another and/or with the infrastructure RAN 152 or vehicular transceiver 136 directly without passing through mobile radio 104.

The RSM video capture device 106 provides voice functionality features similar to a traditional RSM, including one or more of acting as a remote microphone that is closer to the user's 102 mouth, providing a remote speaker allowing play back of audio closer to the user's 102 ear, and including a push-to-talk (PTT) switch or other type of PTT input. The voice and/or audio recorded at the remote microphone may be provided to the mobile radio 104 for further transmission to other mobile communication devices or the infrastructure RAN or may be directly transmitted by the RSM video capture device 106 to other mobile computing devices or the infrastructure RAN. The voice and/or audio played back at the remote speaker may be received from the mobile radio 104 or directly from one or more other mobile computing devices or the infrastructure RAN. The RSM video capture device 106 may include a separate physical PTT switch 108 that functions, in cooperation with the mobile radio 104 or on its own, to maintain the mobile radio 104 and/or RSM video capture device 106 in a monitor only mode, and which switches the devices to a transmit-only mode (for half-duplex devices) or transmit and receive mode (for full-duplex devices) upon depression or activation of the PTT switch 108. The mobile radio 104 and/or RSM video capture device 106 may form part of a group communications architecture that allows a single mobile computing device to communicate with one or more group members (not shown) associated with a particular group of devices at a same time.

Additional features may be provided at the RSM video capture device 106 as well. For example, a display screen 110 may be provided for displaying images, video, and/or text to the user 102. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data or transmit the captured image data to the mobile radio 104 and/or to other mobile computing devices or to the infrastructure RAN directly.

The tablet 107 may be any wireless computing device used for infrastructure RAN or direct-mode media (e.g., voice, audio, video, etc.) communication via a long-range or short-range wireless transmitter with other mobile computing devices and/or the infrastructure RAN. The tablet includes a display screen for displaying a user interface to an operating system and one or more applications running on the operating system, such as a broadband PTT communications application, a web browser application, a vehicle history database application, an arrest record database application, an outstanding warrant database application, a mapping and/or navigation application, a health information database application, or other types of applications that may require user interaction to operate. The tablet display screen may be, for example, a LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the tablet 107, integrating an ability to capture images and/or video of the user 102 and the user's 102 surroundings, and store and/or otherwise process the captured image or video or transmit the captured image or video to the mobile radio 104, other mobile computing devices, and/or the infrastructure RAN.

The vehicle 132 may be any type of vehicle associated with the user 102, and may include its own vehicular video camera 134 and vehicular transceiver 136. The vehicular transceiver 136 may include a long-range transceiver for directly wirelessly communicating with mobile computing devices such as the mobile radio 104, the RSM 106, and the tablet 107, and/or for wirelessly communicating with the RAN 152 via wireless link 144. The vehicular transceiver 136 may further include a short-range wireless transceiver or wired transceiver for communicably coupling with the vehicular video camera 134. An additional electronic processor may be disposed in the vehicle, in the vehicular video camera 134, and/or with the vehicular transceiver 136 for processing video and/or images produced by the vehicular video camera 134 and controlling messaging sent and received via the vehicular transceiver 136.

Each of the mobile radio 104, RSM video capture device 106, tablet 107, and vehicular transceiver 136 may use wireless links 140, 144 to communicate with one another via the infrastructure RAN 152 or with other devices or functions existing in the infrastructure RAN 152.

Infrastructure RAN 152 may implement over wireless links 140, 144 a conventional or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, infrastructure RAN 152 may additionally or alternatively implement over wireless links 140, 144 a Long Term Evolution (LTE) protocol including multimedia broadcast multicast services (MBMS), an open mobile alliance (OMA) push to talk (PTT) over cellular (OMA-PoC) standard, a voice over IP (VoIP) standard, or a PTT over IP (PoIP) standard. In still further embodiments, infrastructure RAN 152 may additionally or alternatively implement over wireless links 140, 144 a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of wireless protocols could be implemented as well. The infrastructure RAN 152 is illustrated in FIG. 1 as providing coverage for the mobile radio 104, RSM video capture device 106, tablet 107, and vehicular transceiver 136 via a single fixed terminal 154 coupled to a controller 156 (e.g., radio controller, call controller, PTT server, zone controller, MME, BSC, MSC, site controller, Push-to-Talk controller, or other network device) and including a dispatch console 158 operated by a dispatcher.

Figure 2:
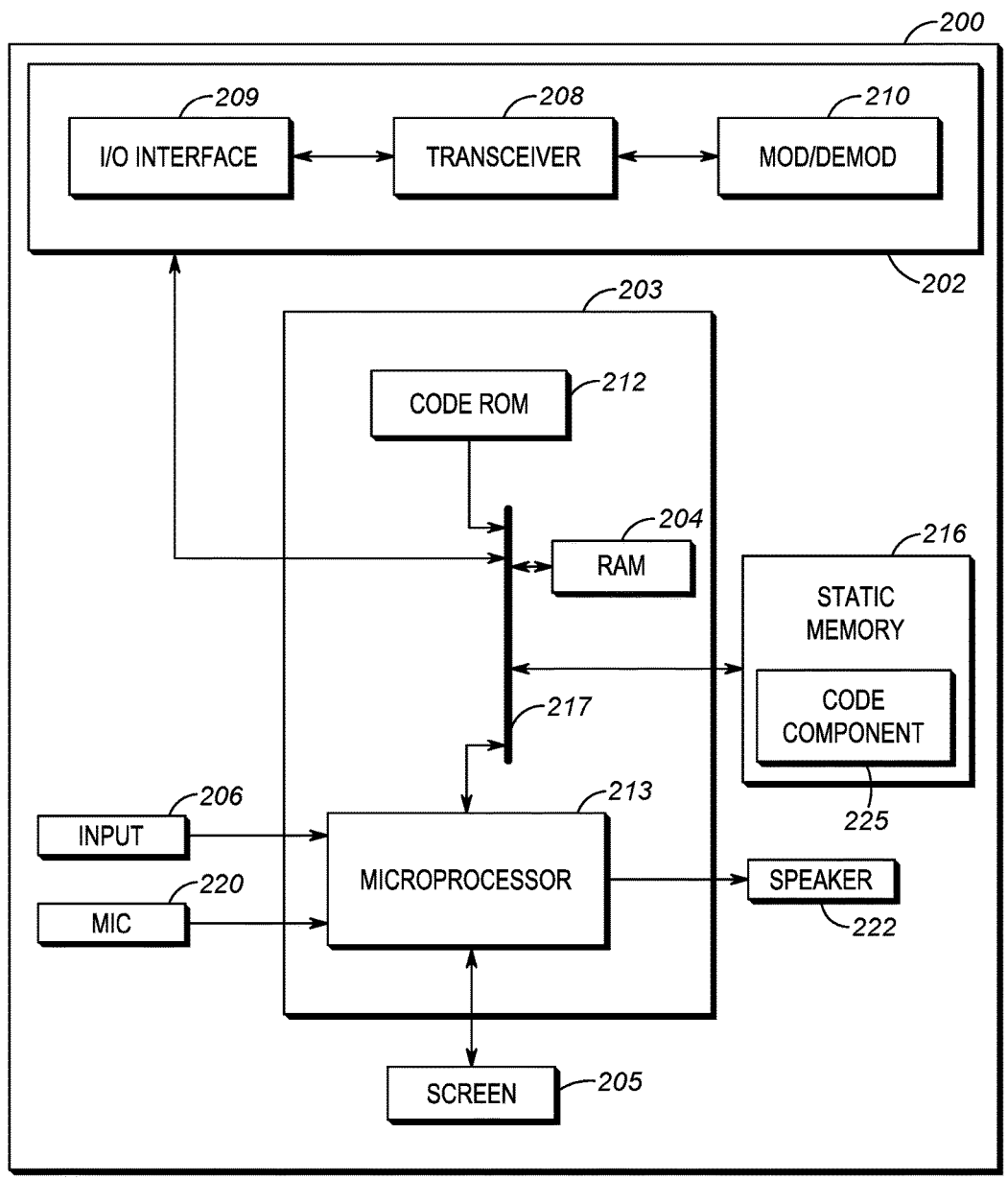
FIG. 2 is a device diagram showing a device structure of the mobile computing device of FIG. 1 in accordance with some embodiments.

Referring to FIG. 2, a schematic diagram illustrates a mobile computing device 200 according to some embodiments of the present disclosure. Mobile computing device 200 may be, for example, the same as or similar to the mobile radio 104, RSM video capture device 106, or tablet 107 of FIG. 1. As shown in FIG. 2, mobile computing device 200 includes a communications unit 202 coupled to a common data and address bus 217 of a processing unit 203. The mobile computing device 200 may also include an input unit (e.g., keypad, pointing device, touch-sensitive surface, etc.) 206 and a display screen 205, each coupled to be in communication with the processing unit 203.

A microphone 220 may be present for capturing audio from a user that is further vocoded by processing unit 203 and transmitted as voice stream data by communication unit 202 to other portable radios and/or other devices. A communications speaker 222 reproduces audio that is decoded from voice streams of voice calls received via the communication unit 202 from other portable radios, from a vehicular transceiver, and/or from an infrastructure RAN device, or may play back alert tones or other types of pre-recorded audio.

The processing unit 203 may include a code Read Only Memory (ROM) 212 coupled to the common data and address bus 217 for storing data for initializing system components. The processing unit 203 may further include a microprocessor 213 coupled, by the common data and address bus 217, to a Random Access Memory (RAM) 204 and a static memory 216.

The communications unit 202 may include one or more wired or wireless input/output (I/O) interfaces 209 that are configurable to communicate with other devices, such as a portable radio, tablet, wireless RAN, and/or vehicular transceiver.

The communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or other similar type of wireless transceiver configurable to communicate via a wireless radio network. The communications unit 202 may additionally or alternatively include one or more wireline transceivers 208, such as an Ethernet transceiver, a Universal Serial Bus (USB) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The microprocessor 213 has ports for coupling to the input unit 206 and the microphone unit 220, and to the display screen 205 and speaker 222. Static memory 216 may store operating code 225 for the microprocessor 213 that, when executed, performs one or more of the mobile computing device steps set forth in FIG. 3 and accompanying text. Static memory 216 may also store, permanently or temporarily, identifications of types of incidents in which a user may become involved in and, for each type of incident, types of unexpected movements and objects to monitor for in an area surrounding the user.

Static memory 216 may comprise, for example, a harddisk drive (HDD), an optical disk drive such as a compact disk (CD) drive or digital versatile disk (DVD) drive, a solid state drive (SSD), a tape drive, a flash memory drive, or a tape drive, to name a few.

2. PROCESSES FOR OPERATING A MOBILE COMPUTING DEVICE TO IMPROVE SITUATIONAL AWARENESS

Figure 3:
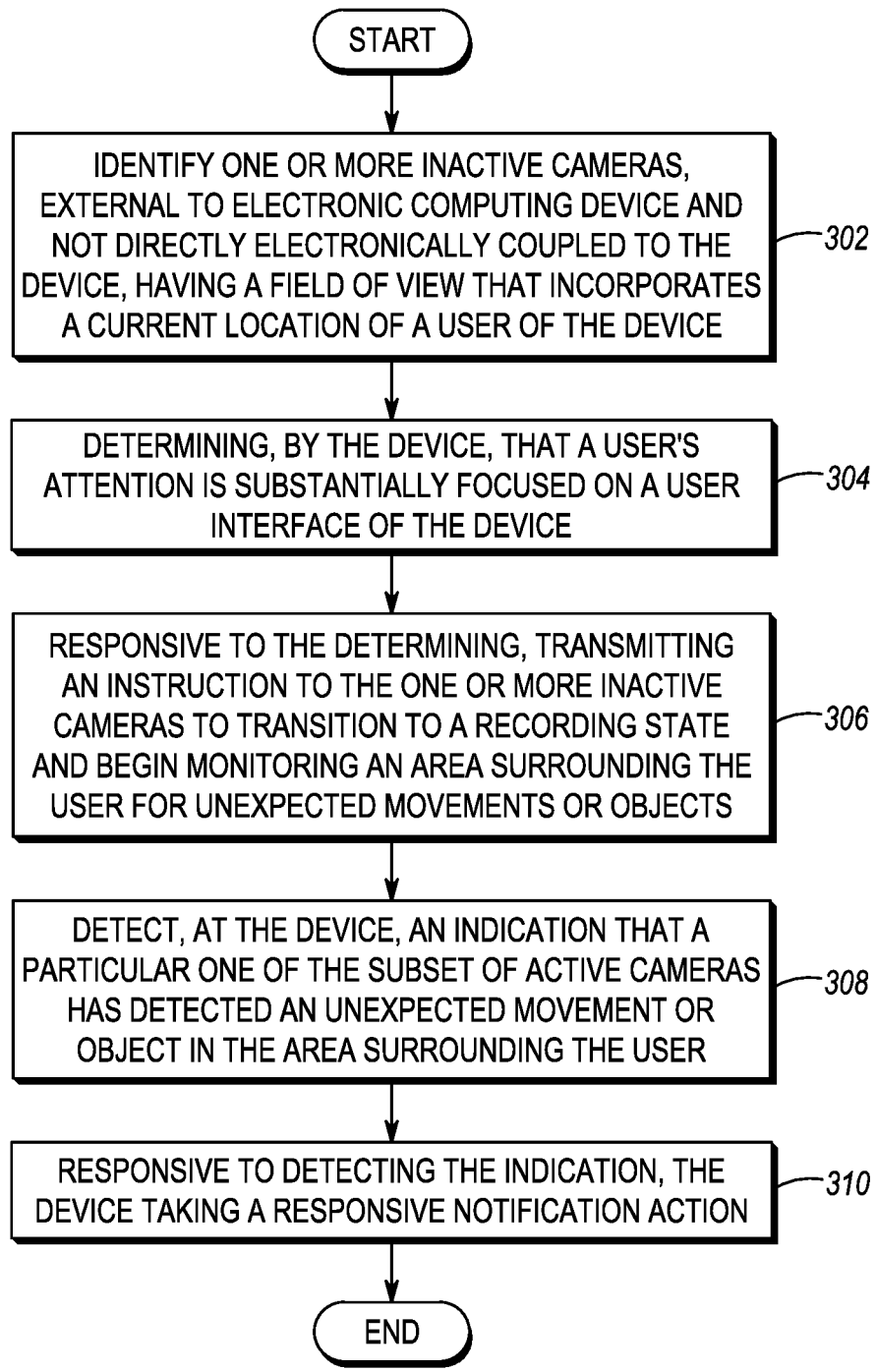
FIG. 3 illustrates a flow chart setting forth process steps for operating the mobile computing device of FIGS. 1 and/or 2 to improve situational awareness in accordance with some embodiments.

Turning now to FIG. 3, a flow chart diagram illustrates a method 300 for improving situational awareness for a user while that user's attention is directed towards interacting with a mobile computing device. While a particular order of processing steps, message receptions, and/or message transmissions is indicated in FIG. 3 for exemplary purposes, timing and ordering of such steps, receptions, and transmissions may vary where appropriate without negating the purpose and advantages of the examples set forth in detail throughout the remainder of this disclosure. The mobile computing device may execute method 300 at power-on, at some predetermined periodic time period thereafter, in response to a trigger raised locally at the device via an internal process or via an input interface (e.g., the user enabling a particular feature associated with method 300 or the mobile computing device detecting that the mobile computing device and user have exited the vehicle, among other possibilities), or in response to detecting a trigger from the portable radio or vehicle to which it is communicably coupled, among other possibilities.

Method 300 begins at step 302 where a mobile computing device identifies one or more available cameras, external to the mobile computing device and not directly electronically coupled to the device, having a field of view that currently incorporates or could be made to incorporate a current location of the mobile communication device and/or the user of the device. The one or more available cameras may be, for example, a vehicular camera such as vehicular video camera 134 of FIG. 1, a body camera affixed to another user, a fixed camera coupled to a nearby utility pole, a camera equipped to a nearby ATM machine, a camera-equipped drone, or some other camera available nearby the user and having a field of view that covers the user.

In some embodiments, the mobile computing device may already be paired with such cameras via Bluetooth, WiFi, LTE, or other type wireless personal area network (PAN), local area network (LAN), or wide area network (WAN).

In other embodiments, the mobile computing device may periodically or on-demand discover the availability of such cameras via a local direct-mode wireless broadcast of a discovery packet (which may include information regarding the user such as the user's location and/or the mobile computing device's location) and subsequent receipt of a response from nearby available cameras indicating their availability and a field of view that covers the user (and which in some embodiments may include additional camera imaging parameters such as distance from the user, signal strength of the discovery packet, field of view, pan/tilt/zoom capability, resolution, frame rate, power source, etc.). The mobile computing device may send its own location as a substitute for the user's location, or may send a separately determined location of the user (via some other locationing sensor or technique provided at the mobile computing device or other device within the user's PAN).

Cameras in receipt of the request may determine their own availability and whether they have a field of view covering the user and/or the mobile communication device using one or more of their own known location, the received location of the user/mobile communication device, a signal strength and direction of arrival of the discovery packet, and/or other parameters.

In other embodiments, the mobile computing device may discover the availability of such cameras via a request transmitted to a network such as RAN 152 of FIG. 1, after which the infrastructure RAN may process the request by similarly polling available cameras in a vicinity of the user for their ability to cover the user or by accessing a database of known available cameras and their associated location and field of view (and other imaging parameters). The cameras reached by the mobile computing device may already be active and recording and already have the user in their field of view, may already be active and recording and may not have the user in their field of view (but may be capable of panning/tilting/zooming to cover the user), or may not currently be active or recording but be capable of transitioning to an active state and covering the user upon a subsequent request by the mobile computing device or infrastructure RAN.

At step 304, the mobile computing device determines that a user's attention is substantially focused on a user interface of the mobile computing device. In other words, the mobile computing device determines that, although some user peripheral vision may be able to detect some motion outside of the main focus of the user's attention and gaze, evidence of the user's interaction with the device and/or detection of the user's eye gaze indicates that the user's attention outside of and beyond the mobile computing device's user interface is seriously hindered, creating a potentially hazardous situation for the user while that user is not able to focus substantially on his or her surroundings.

In one embodiment, the mobile computing device at step 304 may determine that the user's attention is substantially focused on the user interface by detecting a manipulation of the user interface by the user, such as activation of a user interface element via a touch (capacitive, resistive), mechanical (e.g., keys, switches, buttons, etc.), or gestural (e.g., optically detected hands, arms, eye motion, etc.) input, among other possibilities. The mobile computing device may determine that the user's attention is substantially focused on the user interface during the actual detection of the particular input activation and for some time period afterwards, such as 1-5, 1-20, or 1-30 seconds after the particular input activation. After the time period has expired without any further detected input activation, the mobile computing device may determine that the user's attention is no longer substantially focused on the user interface.

In another embodiment, the mobile computing device at step 304 may determine that the user's attention is substantially focused on the user interface by detecting that the user's eye gaze is focused on the mobile computing device user interface. For example, a front facing imaging device (e.g., a video camera) integrated in the mobile computing device may optically track a user's gaze, such as by using infrared light reflections to track movements in a center of the pupil, front of the cornea, and/or back of the lens, or by tracking movements in detected retinal blood vessels, among other possibilities. The mobile computing device may determine that the user's attention is substantially focused on the user interface during the actual detection of the user's eye gaze on the user interface, and perhaps a shortened time thereafter, such as 0.1-1, 0.1-2, or 0.1-5 seconds after the user's eye gaze is detected to avert away from the user interface. Immediately upon detecting the averted gaze, or after the time period has expired, the mobile computing device may determine that the user's attention is no longer substantially focused on the user interface.

At step 306, and responsive to the determining that the user's attention is substantially focused on a user interface of the mobile computing device, the mobile computing device transmits an instruction to the one or more of the identified available cameras to transition to an active state (if not already in an active state) and/or to a recording state (if not already in a recording state) and begin monitoring the area surrounding the user for unexpected movement or objects. The instruction transmitted at step 306 may include an updated location of the user and/or mobile computing device (if changed from step 302). Available cameras that receive the instruction may transition from an inactive to an active recording state and/or from a not recording state to a recording state (if not already in such states), and reposition their field of view (if possible and/or if necessary via a pan/tilt/zoom mechanism) to cover the area of the user and/or mobile computing device. The video/images captured by each available camera may be stored locally at the respective available camera, transmitted to an infrastructure RAN such as RAN 152 for further storage and/or processing, and/or provided back to the mobile computing device for further storage and/or processing.

The image processing device processing the recorded image/video (which may be a controller such as the controller 156 in the infrastructure RAN 152, a processor in a nearby vehicle such as vehicle 132 recording the video, the mobile computing device itself, the available camera itself, or some other processing device) may be preconfigured with a list of objects to identify in the recorded image/video and which would trigger an indication to be sent to the mobile computing device or raised at the mobile computing device. For example, a preconfigured set of images associated with hazardous persons, devices, or graphic imagery may be stored at the image processing device and compared against sub-portions of the recorded image/video to detect such hazardous activities, devices, or events. For example, images of weapons such as knives or guns, images of known suspects, images of wanted criminals, images of hazardous materials containers, images of hazardous warning labels, images of different types of fires or flames, or other types of images may be pre-stored and matched against captured image/video to detect such hazardous activities, devices, or events in the area surrounding the user.

In other embodiments, the mobile computing device itself, perhaps with knowledge of the incident in which the user is involved, may provide an indication to the available camera or associated image processing device in the instruction sent at step 306 or some subsequent message that allows the image processing device to sub-select a portion of those preconfigured images based on the incident type. For example, if the user, while using the user interface of the mobile computing device, has indicated in some manner that he or she is currently at a fire, the incident type of 'fire' may be transmitted to the image processing device, which in response can sub-select a set of fire-incident-specific images (such as flames, flammable warning signs, etc.) to monitor for in the captured video or images. In another example, the incident type transmitted to the image processing device may be 'warrant check,' and the image processing device may sub-select a set of warrant-check-specific images (such as images of the suspect having the outstanding warrant, weapon images, etc.) to monitor for in the captured video or images. In a still further embodiment, the mobile computing device itself may directly provide the sub-selected set of images to the image processing device to monitor for in the captured video or images.

Similarly, the image processing device processing the recorded image/video may be preconfigured with a list of unexpected movements to identify in the recorded image/video and which would trigger an indication to be sent to the mobile computing device or raised at the mobile computing device. For example, a preconfigured set of movements associated with a vehicle or person (or minimum number of persons or vehicles) approaching the user at a threshold minimum speed may be stored at the image processing device and compared against sub-portions of the recorded video to detect such hazardous activities or events.

In other embodiments, the mobile computing device itself, perhaps with knowledge of the incident in which the user is involved, may provide an indication to the image processing device in the instruction sent at step 306 or some subsequent message that allows the image processing device to sub-select a portion of those unexpected movements based on the incident type. For example, if the user, while using the user interface of the mobile computing device, has indicated in some manner that he or she is currently at a fire, the incident type of 'fire' may be transmitted to the image processing device, which in response can sub-select a set of fire-incident-specific unexpected movements (such as a stumbling survivor or a quickly escaping suspect, etc.) to monitor for in the captured video or images. In another example, the incident type transmitted to the image processing device may be 'warrant check,' and the available cameras may sub-select a set of warrant-check-specific unexpected movements (such as a sneaking suspect, etc.) to monitor for in the captured video or images. In a still further embodiment, the mobile computing device itself may directly provide the sub-selected set of unexpected movements to the image processing device to monitor for in the captured video or images.

In some embodiments, the available cameras may be activated at step 306 and may never detect an unexpected movement or object. In this embodiment, steps 308 and 310 are never executed. Furthermore, and after the mobile computing device determines that the user's attention is no longer substantially focused on the user interface of the device, and perhaps after the time periods noted above, processing may return to step 302.

In any event, at step 308 in the example set forth in FIG. 3, the mobile computing device detects an indication that a particular one of the available cameras has recorded an unexpected movement or object in the area surrounding the user. In an embodiment in which the mobile computing device is receiving video streams from one or more of the available cameras, this may include the mobile computing device itself detecting the unexpected movement or object and raising the indication. In embodiments in which a image processing device external to the mobile computing device (e.g., at the respective available camera, at the vehicle associated with the respective available camera, at a mobile radio of another user associated with the respective available camera, in the RAN infrastructure RAN, or elsewhere) is performing the analysis and transmitting the indication of the unexpected movement or object to the mobile computing device, this may include the mobile computing device wirelessly receiving the indication via a transceiver. The indication may include an identity (e.g., hardware address, physical street address, vehicle identifier with which it is associated, username of another user/wearer of the camera, etc.) of the particular one of the available cameras that captured the video in which the unexpected movement or object was detected, and may include an indication identifying the particular unexpected movement or object that was detected.

At step 310, and in response to detecting the indication at step 308, the mobile computing device takes a responsive notification action. The responsive notification action could include one or more different types of notification actions, and which one or more different notification actions taken may vary depending on the underlying type of unexpected object or movement detected and whether the mobile computing device determines that the user's attention is still substantially focused on the user interface of the mobile computing device, among other possibilities.

For example, the notification may include generating and displaying a notification window with alphanumerical notification text in the user interface of the mobile computing device alerting the user to the unexpected object or action indicated in the detected indication of step 308. For example, the notification window may alert the user to the presence of a facially-recognized suspect within the area surrounding the user, or may alert the user to the presence of a detected weapon or hazardous material. In some embodiments, the notification window may also include a relative (to the user) or absolute location of the detected object or movement (e.g., an arrow pointing in the direction of the unexpected object or movement or a pin placed on a map indicating an estimated location of the unexpected object or movement). The notification window may also include an identification of the particular available camera that captured the video stream in which the unexpected object or action was detected, and may include a link or button that allows the user to bring up a live video stream for that particular available camera in the user interface. In response to receiving the notification, the user can avert their attention to their surroundings and identify the unexpected object or movement for themselves so that the user can evaluate any potential threats with their full attention now focused on their surroundings and not on the mobile computing device.

In another example, and instead of a notification window, a video stream window may be immediately raised by the mobile computing device, responsive to detecting the indication, at the user interface that provides a live video stream for that particular available camera noted above. The live video stream may be modified by the mobile computing device or the image processing device that detected the unexpected movement or object to highlight or outline the unexpected movement or object so that the unexpected movement or object stands out in the displayed video stream. In addition, an alert tone or flashing border on the video stream window may provide additional warning to the user that the displayed video stream includes a detected unexpected movement or object. In response to receiving the video stream notification, the user can view in substantially real time what unexpected movement or object triggered the indication, and can then avert their attention to their surroundings and identify the unexpected object or movement for themselves so that the user can evaluate any potential threats with their full attention now focused on their surroundings and not on the mobile computing device.

In some embodiments in which a plurality of available cameras were identified in step 302 and each of the plurality of available cameras generate video streams that cause separate indications to be provided to and detected by the mobile computing device at step 308, the mobile computing device may modify the displayed notification window and/or video stream to take advantage of the plurality of available cameras detecting the unexpected movement or object. For example, in the embodiment in which an alphanumerical text-based notification window is generated at the user interface, the mobile computing device may indicate how many of the available cameras detected the indication, and may provide a prioritized list of links to the available cameras so that the user can choose which video stream to subsequently bring up, if desired. Furthermore, in the embodiment in which a video stream window is immediately raised at the user interface, the mobile computing device may chose a particular video stream to display in the video stream window based on the prioritized list of available cameras, taking into account additional imaging parameters that may have been previously provided by the available cameras in steps 302 and/or 308, such as one or more of distance from the user, field of view, pan/tilt/zoom capability, resolution, frame rate, power source, etc. In some embodiments, both an alphanumeric notification window and a single video stream window of the highest prioritized video stream may be raised, and in still further embodiments, the alphanumeric notification window and a single video stream window may be combined into a single window in which the alphanumeric notification text normally included in the alphanumeric notification window are captioned underneath the video stream or embedded or overlaid on top of the video of the video stream.

In some embodiments, the prominence of the displayed alphanumeric notification window and/or video stream window may vary based on the unexpected object or movement detected. For example, if the indication detected at step 308 identifies the particular object detected as a higher priority object such as a weapon, the displayed alphanumeric notification window and/or video stream window may be displayed at the user interface in a more prominent fashion, for example at a larger or largest possible screen size, at a center most area of the screen, and/or accompanied by an audio tone or flashing colors or borders. If, on the other hand, the indication detected at step 308 identifies the particular object detected as a lower priority object such as a chemical container warning, the displayed alphanumeric notification window and/or video stream window may be displayed at the user interface in a less prominent fashion, for example at a smaller or smallest possible screen size, at a corner area of the screen, and/or not accompanying any additional audio tone or flashing colors or borders. Similar variations can be applied to different types of unexpected movements.

In a still further embodiment, the responsive notification action taken by the mobile computing device at step 310 may include, additionally or alternatively, transmitting an alert regarding the detected indication to one of another nearby user, such as another nearby officer or first responder, or transmitting the alert regarding the detected indication to a dispatcher in the infrastructure RAN. The transmitted alert may include same or similar information as that set forth in the detected indication at step 308, and may include similar links to the video streams of the one or more particular available cameras as set forth above. In this manner, additional support can be provided to the user to ensure that their attention is re-focused on their surroundings and they are kept out of harm's way.

3. CONCLUSION

In accordance with the foregoing, an improved device, method, and system is disclosed for improving situational awareness for a user while that user's attention is directed towards interacting with a mobile computing device. As a result of the foregoing, a user may be alerted or warned when an unexpected object or action is taken in their surroundings that they may not have noticed due to the fact that their attention is substantially focused on the user interface of the mobile computing device. Accordingly, the user's awareness of their surroundings is improved and their safety enhanced while interacting with the mobile computing device In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of selectively activating a guardian camera in response to detecting a distracted user, the method comprising:
   identifying, by an mobile computing device having a user interface, one or more available cameras external to the mobile computing device and not directly electronically coupled to the mobile computing device, having a field of view that incorporates a current location of a user of the mobile computing device;
   determining, by the mobile computing device having a user interface, that a user's attention is substantially focused on the user interface and not an area surrounding the user;
   responsive to the determining transmitting, by the mobile computing device, an instruction to the one or more available cameras to transition to a recording state and/or begin monitoring the area surrounding the user for unexpected movements or objects; and
   detecting, at the mobile computing device, an indication that a particular one of the available cameras has recorded an unexpected movement or object in the area surrounding the user and the mobile computing device taking a responsive action.

2. The method of claim 1, wherein the responsive action is displaying a notice to the user via the user interface associated with the indication.

3. The method of claim 1, wherein the responsive action is displaying a video stream from the particular one of the available cameras.

4. The method of claim 3, wherein the mobile computing device receives a plurality of indications from a plurality of the available cameras that each of the plurality of available cameras has recorded the unexpected movement or object in the area surrounding the user and the mobile computing device displaying the video stream from the particular one of the available cameras comprises the mobile computing device ranking each of the plurality of available cameras based on one or more imaging parameters and choosing the particular one of the available cameras as a highest ranked available camera to provide and display the video stream from the particular one of the available cameras.

5. The method of claim 4, wherein the one or more imaging parameters include two or more of field of view, resolution, ability to pivot, frame rate, and power source.

6. The method of claim 3, wherein a portion of the displayed video stream is modified to particularly identify the recorded unexpected movement or object.

7. The method of claim 3, wherein the particular one of the available cameras is a vehicular camera associated with one of the user and the mobile computing device.

8. The method of claim 3, wherein the particular one of the available cameras is a body camera of another user within communication range of the user.

9. The method of claim 1, wherein the responsive action includes wirelessly transmitting an alert, by the mobile computing device, to one of an infrastructure dispatcher and another nearby user.

10. The method of claim 9, wherein the alert includes a link to retrieve a video stream from the particular one of the available cameras.

11. The method of claim 1, wherein prior to detecting the indication, the mobile computing device provides the one or more available cameras, or an image processing device associated therewith, with one of i) an identification of a type of incident the user is currently involved in for use by the one or more available cameras in determining, upon becoming active, types of unexpected movements and objects to monitor for in the area surrounding the user and ii) an identification of types of unexpected movements and objects to monitor for in the area surrounding the user.

12. The method of claim 11, wherein the one of the identification of a type of incident and the identification of types of unexpected movements and objects to monitor for are extracted as a function of information received from the user via the user interface at the mobile computing device.

13. The method of claim 1, wherein determining that the user's attention is substantially focused on the user interface comprises detecting that the user is currently providing an input to the user interface.

14. The method of claim 13, wherein detecting that the user is currently providing an input to the user interface comprises detecting, by the mobile computing device, a touch input at the user interface.

15. The method of claim 1, wherein determining that the user's attention is substantially focused on the user interface comprises detecting, via a front-facing imaging device at the mobile computing device, that a user's eye gaze is directed at the user interface.

16. The method of claim 1, wherein detecting the indication that the particular one of the available cameras has recorded the unexpected movement or object in the area surrounding the user comprises one of (i) receiving an indication from the particular one of the available cameras that the unexpected movement or object has been detected by the particular one of the available cameras and (ii) receiving a video stream from the particular one of the available cameras and the mobile computing device detecting, in the received video stream, the unexpected movement or object.

17. The method of claim 16, wherein detecting the indication that the particular one of the available cameras has recorded the unexpected movement or object in the area surrounding the user comprises receiving the video stream from the particular one of the available cameras and the mobile computing device detecting, in the received video stream, the unexpected movement or object.

18. A mobile computing device for selectively activating a guardian camera in response to detecting a distracted user, the device comprising:
a display displaying a user interface;
a wireless transceiver; and
one or more processors configured to:
  identify one or more available cameras external to the mobile computing device and not directly electronically coupled to the mobile computing device, having a field of view that incorporates a current location of a user of the mobile computing device;
  determine that a user's attention is substantially focused on the user interface and not an area surrounding the user, and responsively:
    transmit, via the wireless transceiver, an instruction to the one or more available cameras to transition to a recording state and/or begin monitoring the area surrounding the user for unexpected movements or objects; and
    detect an indication that a particular one of the available cameras has recorded an unexpected movement or object in the area surrounding the user and take a responsive action.

19. The mobile computing device of claim 18, wherein the one or more processors are further configured to detect the indication that the particular one of the available cameras has recorded the unexpected movement or object in the area surrounding the user by one of (i) receiving, via the wireless transceiver, an indication from the particular one of the available cameras that the unexpected movement or object has been detected by the particular one of the available cameras and (ii) receiving, via the wireless transceiver, a video stream from the particular one of the available cameras and the mobile computing device detecting, in the received video stream, the unexpected movement or object.

20. A system comprising:
a mobile computing device comprising:
a display displaying a user interface;
a wireless transceiver; and
one or more processors configured to:
  identify one or more available cameras external to the mobile computing device and not directly electronically coupled to the mobile computing device, having a field of view that incorporates a current location of a user of the mobile computing device;
  determine that a user's attention is substantially focused on the user interface, and responsively:
    transmit, via the wireless transceiver, an instruction to the one or more available cameras to transition to a recording state and/or begin monitoring an area surrounding the user for unexpected movements or objects; and
    detect an indication that a particular one of the available cameras has recorded an unexpected movement or object in the area surrounding the user and take a responsive action; and
a remote wireless imaging device comprising:
an imaging device;
a second wireless transceiver; and
one or more second processors configured to:
  receive, via the second wireless transceiver, the instruction to transition to a recording state and/or begin monitoring an area surrounding the user for unexpected movements or objects;
  responsive to receiving the instruction, enabling the imaging device and capturing images or video of an area surrounding the user; and
  analyzing the captured images or video for unexpected movements or objects and, responsive to detecting a first unexpected movement or object in the captured images or video, transmitting, via the second wireless transceiver, the indication to the mobile computing device.

* * * * *